United States Patent
Fontaine et al.

(10) Patent No.: US 11,606,618 B2
(45) Date of Patent: Mar. 14, 2023

(54) METHOD FOR MANAGING THE RECEPTION OF DIGITAL CONTENTS BY A MANAGEMENT DEVICE

(71) Applicant: ORANGE, Issy-les-Moulineaux (FR)

(72) Inventors: Fabrice Fontaine, Chatillon (FR); Herve Marchand, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 46 days.

(21) Appl. No.: 16/464,504

(22) PCT Filed: Nov. 20, 2017

(86) PCT No.: PCT/FR2017/053177
§ 371 (c)(1),
(2) Date: May 28, 2019

(87) PCT Pub. No.: WO2018/100264
PCT Pub. Date: Jun. 7, 2018

(65) Prior Publication Data
US 2021/0112308 A1      Apr. 15, 2021

(30) Foreign Application Priority Data
Dec. 1, 2016   (FR) ...................... 1661798

(51) Int. Cl.
*H04N 21/422*   (2011.01)
*H04N 21/438*   (2011.01)
(Continued)

(52) U.S. Cl.
CPC ....... *H04N 21/4722* (2013.01); *G06F 3/0346* (2013.01); *H04N 21/41265* (2020.08); *H04N 21/42222* (2013.01); *H04N 21/4383* (2013.01)

(58) Field of Classification Search
CPC ............. H04N 21/4263; H04N 21/434; H04N 21/4384; H04N 21/4424; H04N 21/4532; H04N 21/482; H04N 5/50
See application file for complete search history.

(56) References Cited

U.S. PATENT DOCUMENTS

| 2004/0218104 | A1 | 11/2004 | Smith et al. |
| 2011/0058107 | A1* | 3/2011 | Sun ........................ G06F 3/0346 348/734 |
| 2012/0131627 | A1* | 5/2012 | Chittella ............ H04N 21/4621 725/109 |

FOREIGN PATENT DOCUMENTS

| WO | 2008002312 A1 | 1/2008 | |
| WO | WO-2008002312 A1 * | 1/2008 | ....... H04N 21/44222 |

OTHER PUBLICATIONS

International Search Report dated Jan. 15, 2018 for corresponding International Application No. PCT/FR2017/053177, filed Nov. 20, 2017.

(Continued)

*Primary Examiner* — Rong Le
(74) *Attorney, Agent, or Firm* — David D. Brush; Westman, Champlin & Koehler, P.A.

(57) ABSTRACT

A method for managing reception of digital contents by a management device suitable for receiving a command for selecting a content, termed the main content, arising from a control device. The management device is suitable for requesting reception of the main content and of other digital contents, termed secondary contents. It is also suitable for receiving the data streams representative of the requested contents, and for requesting the retrieval of the main content. According to the method, in the course of retrieval of the main content, a detection of an activity related to the control device triggers a request suitable for requesting reception of the secondary contents.

7 Claims, 2 Drawing Sheets

(51) Int. Cl.
*G06F 3/0346* (2013.01)
*H04N 21/4722* (2011.01)
*H04N 21/41* (2011.01)

(56) References Cited

OTHER PUBLICATIONS

Written Opinion of the International Searching Authority dated Jan. 15, 2018 for corresponding International Application No. PCT/FR2017/053177, filed Nov. 20, 2017.
International Preliminary Report on Patentability and English translation of the Written Opinion dated Jun. 4, 2019 for corresponding International Application No. PCT/FR2017/053177, filed Nov. 20, 2017.

* cited by examiner

METHOD FOR MANAGING THE RECEPTION OF DIGITAL CONTENTS BY A MANAGEMENT DEVICE

CROSS-REFERENCE TO RELATED APPLICATIONS

This Application is a Section 371 National Stage Application of International Application No. PCT/FR2017/053177, filed Nov. 20, 2017, which is incorporated by reference in its entirety and published as WO 2018/100264 A1 on Jun. 7, 2018, not in English.

TECHNICAL FIELD

The invention relates to a field of telecommunications.

More particularly, the invention relates to a method for managing the reception of multimedia contents by a management device for rendering on a rendering device.

Multimedia contents are understood to be any audio and/or video content such as television channels, also called audiovisual channels.

The management device targeted is a quite separate device capable of being connected to a rendering device. This management device can also be incorporated in another device; in this configuration, this other device is for example a television, a digital television decoder, a home gateway, etc.

STATE OF THE ART

New control modes for controlling audiovisual appliances have recently been developed. The means of navigating consists generally in using the direction arrows of a remote control, in particular using the P+ and P− buttons to navigate, or "zap", very simply between the audiovisual channels proposed on the graphical interface rendered on the rendering device.

The time needed to perform a zapping by P+/P− key on a digital television decoder connected to a network, for example of IPTV (Internet Protocol Television) type, is relatively significant, of the order of approximately 3 seconds. In fact, to access a broadcast stream in multicast mode, the decoder must subscribe to this stream, for example through an IGMP (Internet Group Management Protocol) protocol. The time needed to display the stream on the television then depends on many factors such as the size of the groups of pictures GOP (acronym for "Group Of Pictures") in accordance with the MPEG (acronym for "Moving Picture Experts Group") standard or the size of the buffer memory (also called Buffer) present in the decoder.

Some techniques make it possible to considerably reduce this waiting time like the technique called "fast zapping" by the person skilled in the art. This technique available for terminals having a very high bandwidth consists in receiving several data streams at the same time; more particularly, the principle consists in automatically accessing (or "subscribing") to a selected channel and also to other channels for example to the adjacent channels, namely the preceding channel and the next channel. The decoder then receives the data streams corresponding to the three channels, and decodes the corresponding data streams. At this stage, the selected channel is rendered and the other data corresponding to the adjacent channels are received and ready to be rendered on request.

Also, if the decoder receives a channel change command, and the channel is part of the adjacent channels; in this particular case, this televised channel is rendered without requiring a subscription command to be sent over the network. The result thereof is a very rapid change of channel (also called zapping).

This technique called "fast zapping" is however very consuming in terms of network resources, in particular bandwidth; to resolve this consumption problem, following a detection of an inactivity of the user, for example because the user watches the same channel for a certain period, for example 30 seconds, the decoder unsubscribes from the adjacent channels and no longer receives them. In other words, to return to the example described above, the data streams representative of the adjacent channels are no longer received. In this configuration, after the expiry of the period (30 seconds in our example), if the user wants to access a channel adjacent to the rendered channel, the decoder must resubscribe to the channel concerned and therefore wait a few seconds (3 seconds in our example) before the content is rendered.

The invention offers a solution that does not present the drawbacks of the state of the art.

THE INVENTION

To this end, according to a functional aspect, the subject of the invention is a method for managing the reception of digital contents by a management device capable of receiving a command for selection of a content, called main content, from a control device, the management device being capable of requesting access to the main content and to other digital contents, called secondary contents, of receiving the data streams representative of the requested contents, and of requesting the rendering of the main content, characterized in that in the course of the rendering of the main content, a detection of an activity linked to the control device triggers a request capable of requesting the reception of the secondary contents.

The solution proposes automatically triggering the reception (also called subscription by the person skilled in the art) of the secondary contents, typically of the adjacent channels, or of the preferred channels, as a function of an activity detected in conjunction with the control device; the detected activity being able to be interpreted as a probable intention to change channel.

Also, the solution avoids subscribing to the secondary channels on each request for access to a main content as is the case in the state of the art. By taking the example of televised channels, when a user selects a channel, with the invention two variants are possible:
 a. either the management device requests access to both the main content and the secondary contents.
 b. or it simply requests access to the main content and requests access to the secondary channels only as a function of the activity of the control device.

According to an embodiment, the secondary contents are received during a given reception period (or time band). This mode avoids receiving secondary contents unnecessarily in particular when the user has no intention to zap.

According to an embodiment of the invention, which will be able to be implemented as an alternative to or together with the preceding one, if a period is in the course of execution for a secondary content, a detection of an activity of the control device during this period leads to an updating of the period of reception for this secondary content. In effect, a movement detected during a period in the course of execution (or currently running) is evidence of a certain instability of the user in the choice of the channel to be rendered. This occurs often at the start of the rendering of a content when, for example, the user is searching for a televised program which is suitable for him or her. In this configuration, the device increases the initial period of reception of the secondary streams.

According to another embodiment, which will be able to be implemented as an alternative to or together with the preceding one, the activity is a movement of the control device. This other mode is advantageous because any movement of the remote control, and therefore probably of the hand of the user, systematically triggers a request for reception of the secondary contents.

"Movement of the control device" is understood to mean any information representative of a movement produced by a user, more particularly his or her hand, in space. It will be recalled that, conventionally, the movement of a solid can be characterized by a set of vectors associated with said solid (position, speed, acceleration vectors). For example, in the context addressed here, it can be a circular, translational or other such movement, accompanied by a speed and an acceleration, uniform or not. Also, some activities can be excluded such as dropping of the control device. An accelerometer present in the control device can allow for a distinction between a drop and a normal movement of the control device.

According to another embodiment, which will be able to be implemented as an alternative to or together with the preceding ones, the activity is a press on a key of the control device; the key is for example a press on the volume key. This other mode is advantageous because it is less costly in terms of network resources than the preceding ones; in effect, the triggering is not based only on movement but also on a press on a key of the remote control; the press on a key can be interpreted as a very probable intention to modify a parameter linked to the rendering, this parameter being able to be a change of content, for example a change of televised channel.

The activity is not limited to the examples given above. Sensors installed on the remote control can also detect the displacement of a user relative to the control device. For example, the approach of a finger of the user toward a key of the remote control, in particular the key whose function is to change channel, forms part of an activity linked to the control device.

According to a hardware aspect, the invention relates to a device for managing the reception of digital contents comprising a reception module capable of receiving a command for selection of a content, called main content, from a control device, a request module capable of requesting access to the main content and to other digital contents, called secondary contents, a reception module capable of receiving the data streams representative of the requested contents and a rendering module capable of requesting the rendering of the main content, characterized in that it comprises a processor configured to: in the course of the rendering of the main content, detect an activity linked to the control device and trigger a request capable of requesting the reception of the secondary contents.

According to another hardware aspect, the invention relates to a decoder comprising a management device as defined above.

According to another hardware aspect, the invention relates to a computer program capable of being implemented on a management device as defined above, the program comprising code instructions which, when the program is executed by a processor, performs the defined steps of the method defined above.

According to yet another hardware aspect, the invention deals with a storage medium that can be read by a data processor on which is stored a program comprising program code instructions for the execution of the steps of the method defined above.

The medium concerned can be any entity or device capable of storing the program. For example, the medium can comprise a storage means, such as a ROM, for example a CD ROM or a microelectronic circuit ROM, or even a magnetic storage means, for example a diskette (floppy disc) or a hard disc. Also, the information medium can be a transmissible medium such as an electrical or optical signal, which can be routed via an electrical or optical cable, wirelessly or by other means. The program according to the invention can in particular be downloaded over a network of Internet type. Alternatively, the information medium can be an integrated circuit in which the program is incorporated, the circuit being adapted to execute or to be used in the execution of the method concerned.

The invention will be better understood on reading the following description, given by way of example and with reference to the attached drawings in which.

DETAILED DESCRIPTION OF ONE OR MORE EXEMPLARY EMBODIMENTS ILLUSTRATING THE INVENTION

Figure 1:
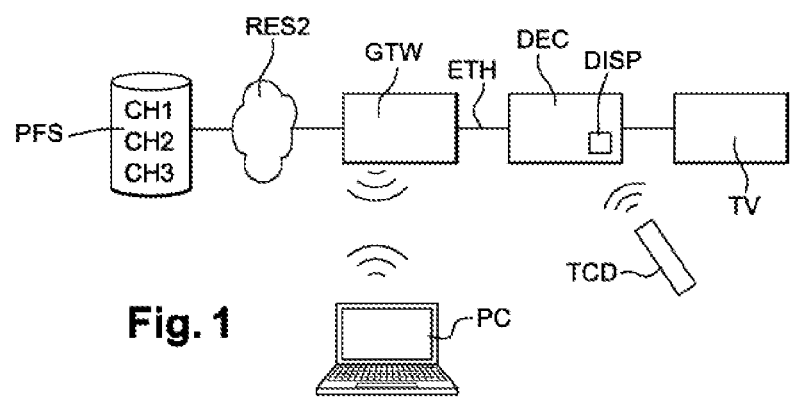
FIG. 1 represents a computer system on which there is illustrated an example embodiment of the invention.

FIG. 1 represents a system SYS comprising a control device TCD, a device DEC, a television TV, a service platform PF.

In our example, the device DEC is a decoder. This decoder communicates with the service platform PFS via a communication network RES1. In our example, this communication is performed via a home gateway GTW (or router).

In our example, the service platform PFS comprises a plurality of services such as access to television channels, access to multimedia contents (video on demand, TV on demand, etc.), online games, etc.

The platform PFS could also be split up so as to offer services distributed in the network RES1.

In our example, the control device TCD is a remote control TCD which makes it possible to control the decoder DEC. A command is for example access to the television channels. By virtue of the remote control, the user can zap from one channel to another.

The decoder DEC and the gateway GTW have a hardware architecture equivalent to a computer; the architecture of a computer will not be described in more detail here to simplify the explanation of the invention.

Referring to FIG. 1, the decoder DEC comprises a management device DISP capable of requesting the reception of (the person skilled in the art also uses the expression "capable of subscribing to") several multimedia data streams illustrated by television channels in our exemplary embodiment. In our example, this management device DISP is a computer program stored in a read-only memory of the decoder DEC.

Figure 2:
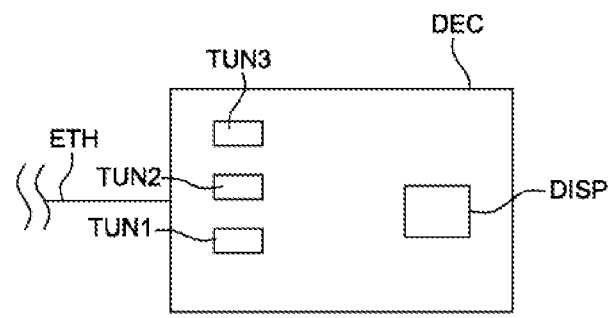
FIG. 2 is a schematic view of a decoder according to an embodiment.

To receive several data streams, referring to FIG. 2, in our example, the decoder DEC is equipped with several demodulators (also called tuners by the person skilled in the art). More particularly, this management device DISP is capable of requesting access to a main channel selected via the remote channel TCD and of requesting the reception of other channels CH, typically the adjacent channels CH− and CH+, called secondary channels. The request for access to the main channel or to the secondary channels can be made simultaneously or at different instants.

These access requests, also called subscriptions, to the channels concerned, made by the decoder, and by influencing the management device DISP, are in our example the channels CH−/CH/CH+, CH− and CH+ designating the adjacent channels of the rendered channel CH.

In concrete terms, the decoder DEC requests
  the reception of a first main stream (in other words "subscribes to the first stream"); the latter will be rendered on the TV screen,
  and the reception of secondary streams, namely the adjacent channels CH− and CH+.

After reception, the decoder DEC decodes the three streams, for example at the same time. At this stage, a television channel is received and rendered, and two other channels are received by the decoder ready to be rendered on request. After reception, the secondary channels are stored in a buffer memory present in the decoder. In this way, if the decoder DEC receives a command to change channel CH+, the decoder requests the rendering of the channel CH+ instead of the channel CH without requiring the need of a request for subscription to the requested channel CH+ close to the platform PFS. This method speeds up the rendering of a channel.

In our example, the remote control TCD communicates with the decoder DEC via a first network RES1 which can be wired (USB, Ethernet, etc.) or wireless, for example of Wifi, ZigBee type. In our example, the remote control and the decoder are equipped with respective ZigBee modules.

It will be recalled that ZigBee is a low-power radio wireless technology; it is possible to exchange, over a radio channel, messages conforming to the ZigBee protocol. It is specified here that the ZigBee protocol is a high-level protocol allowing communication of small radios, with reduced consumption, based on the IEEE 802.15.4 standard for the personal area networks (Wireless Personal Area Networks: WPAN).

In our example, the decoder DEC is linked by a cable CBL to the television TV. The cable is for example an HDMI cable. In our example, the decoder is linked to the gateway via an Ethernet cable. The gateway is connected to a wide area network WAN, for example the Internet.

The remote control TCD includes key codes and also includes at least one motion detector capable of detecting a movement of the remote control. A detector can be one of the following: a gyroscope GRS; an accelerometer ACC, etc.

In the current state of the art, a subscription to a secondary channel is cleared if the decoder no longer receives a command to change channel after a given period. Consequently, if the user zaps to another channel, for example an adjacent channel, that results in a not-inconsiderable waiting time; in effect, the decoder DEC must once again resubscribe to the requested channel; that involves a transmission of a request demanding access (or subscription) to the content, and a reception of the content. This communication with the content provider delays the rendering of the content.

The invention proposes reducing this waiting time even when the decoder is no longer subscribed to the adjacent channels. For that, according to the invention, a detection of an activity linked to the remote control, for example a movement of the remote control, automatically triggers a subscription to at least one channel other than that which is rendered. The detection of the movement is interpreted as a probable intention to change channels.

Figure 3:
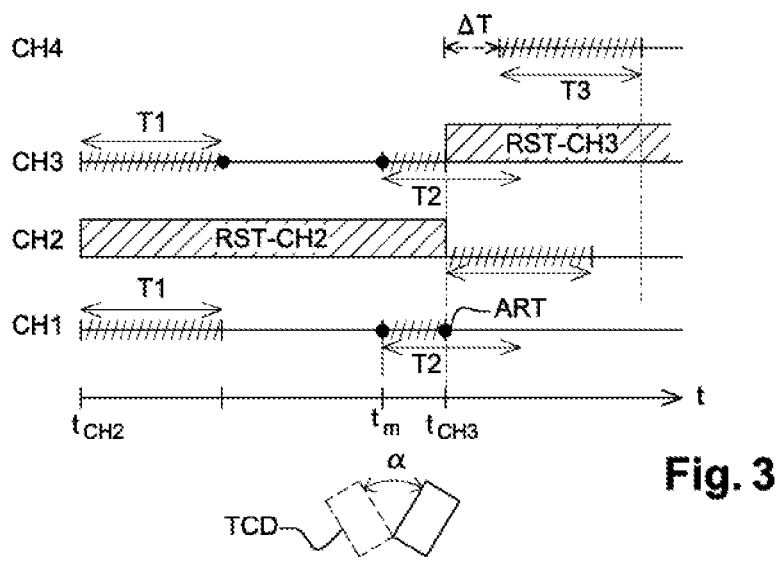
FIGS. 3 to 5 are schematic views of embodiments. These embodiments can be implemented alone or in combination.

FIG. 3 illustrates an embodiment of the method of the invention. This FIG. 3 is a schematic view of subscriptions to different channels, in our example to three channels CH1, CH2 and CH3. Three axes are represented relatively to the three channels respectively coupled to a time axis "t"; these three axes show the reception of the channels by the relevant tuners of the decoder and the rendering (RST-CHx) of a content CHx.

In a first step, the second channel CH2 is selected at an instant tCH2.

In a second step, following the selection, the decoder DEC subscribes to the channel CH2, and optionally to the adjacent channels CH1 and CH3 and receives the corresponding streams simultaneously.

In a third step, the channel CH2 is received and rendered RST-CH2 (represented by a rectangular block on grey background), and the adjacent channels CH1 and CH3 are received without being rendered (cross-hatch parts on the time axes dedicated to the adjacent channels) during a period T1.

On expiry of the period T1, the subscriptions to the streams relating to the adjacent channels expire. The decoder therefore no longer receives the adjacent channels CH1 and CH3 and continues to render RST the channel CH2.

At a subsequent instant Tm, a movement MVT of the remote control is detected.

Following this detection, the decoder DEC subscribes once again to the adjacent channels CH1 and CH3 while maintaining the rendering of the channel CH2. FIG. 3 shows cross-hatched parts, similar to those described above, representative of the reception by the decoder DEC, or more specifically by the relevant tuners, of the adjacent channels CH1 and CH3. A new period T2 is provided for the reception. In our example, the periods T1 and T2 are equal but could be different.

It is then assumed that, during this period T2, at an instant tCH3, the user selects the channel CH3 via the remote control TCD. The decoder DEC receives a signal representative of this selection from the remote control TCD.

In a fourth step, since the decoder is subscribed to this channel and the period has not expired, the decoder renders the channel CH3 without having to request a subscription to this channel from the platform PFS. It is understood here that the rendering is rapid because the data stream representative of the channel is already being received by a tuner of the decoder DEC.

In our example, in this fourth step, at the 'instant tCH3, the decoder DEC requests the stopping ART of the channel CH1 because the latter is not adjacent to the channel CH3. According to a variant, with a decoder having a greater number of tuners, for example eight tuners, the decoder would continue to receive the channel CH1.

In our example, the decoder DEC subscribes to the channels adjacent to this channel CH3; this subscription does not take place if a channel has already been the subject of a subscription and a reception of this channel is in progress. In this particular case, the decoder DEC being already subscribed to the channel CH2, only a subscription to the channel CH4 takes place. This subscription requires a period ΔT to request access to the channel CH4 and receive it. At this stage, the channel CH3 is received and rendered and the channels CH2 and CH4 are received and are not rendered.

It can be seen in the example described with reference to this FIG. 3 that the period T3 relating to the channels CH2 and CH4 expire at different instants because of the period ΔT that is required for the subscription to the channel CH4. However, a mechanism can be implemented for these periods to expire at the same instant. Also, the number of tuners could be greater than three; in this case, assuming that the reception of secondary streams is performed by more than three tuners, for example eight tuners, the channel CH4 would already have been the subject of a subscription; the time offset would not therefore take place.

The invention is not limited to the embodiment described above. The channels to which the decoder DEC subscribes can be channels other than the adjacent channels; the latter can be preferred channels of the user or of a user group. The latter can be defined by the user or deduced according to a log of the channels selected.

In our example, the periods T1 and T2 are the same. However, different periods can be implemented.

Figure 4:
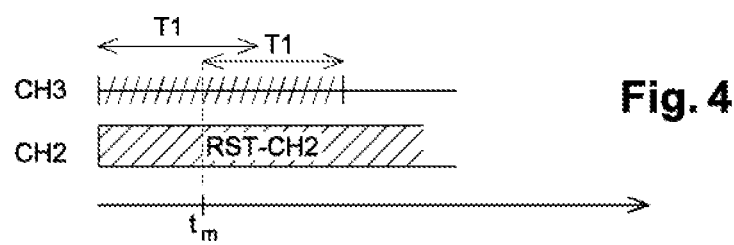

According to another embodiment of the invention, if the period of reception given has not expired, a movement of the remote control leads to the updating of the period of reception. FIG. 4 illustrates this case. To simplify the explanation, let us assume that a channel CH2 is selected for rendering and that the channel CH3 is a secondary channel. It is assumed that the decoder is subscribed to these two channels CH2 and CH3. After subscription, the channel CH2 is received by a tuner and rendered RST-CH2; and that the channel CH3 is received by another tuner (cross-hatch part); a period of reception T1 is provided for the reception of the channel CH3. It is then considered that, in the course of this period T1, a movement of the remote control TCD is detected at the instant tm; at this instant, the decoder DEC updates the period T1 by resetting it; in other words, the period T1 recommences from its beginning. In effect, a movement detected a short while after a channel detection indicates an instability of the user in his choice as to the channel to be selected for the rendering. That occurs often at the start of rendering when the user searching for a televised program that is suitable for him or her. In this configuration, the decoder continues to receive the streams and the period of reception is extended by an additional period. If the period has expired, the streams are once again received during a given period.

Figure 5:
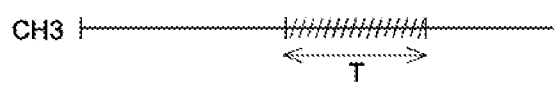
Figure 5:
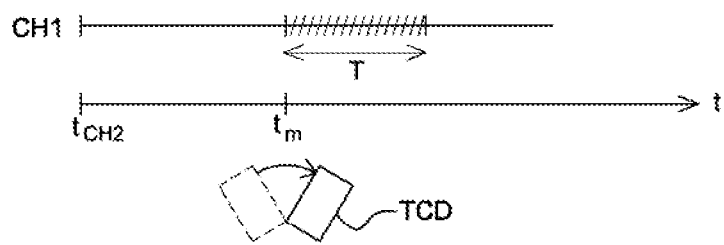

According to another embodiment, the period T is not initiated on the selection of a channel but only upon a detection of an activity of the remote control TCD. This mode is illustrated in FIG. 5. In this figure, the channel CH2 is selected at the instant tCH2. Later, upon the rendering of CH2, a movement of the remote control is detected at an instant tm. At this instant, the decoder requests the reception of the secondary contents, adjacent in our example, namely the channels CH1 and CH3 during a period T.

Note that a module can be implemented in software form, in which it takes the form of a program that is executable by a processor, or in a hardware form, like an application-specific integrated circuit (ASIC), a system on chip (SOC), or in the form of a combination of hardware and software elements, such as, for example, a software program intended to be loaded and executed on a component of FPGA (Field Programmable Gate Array) type.

Based on the embodiment chosen, some deeds, actions, events or functions of each of the methods described in the present document can be performed or occur in an order different from that in which they have been described, or can be added, merged or even not be performed or not occur, depending on the case. Furthermore, in some embodiments, certain deeds, actions or events are performed or occur concurrently and not in succession.

Although described through a certain number of detailed exemplary embodiments, the proposed method and the device for implementing the method comprise different variants, modifications and refinements which will become evident to the person skilled in the art, it being understood that these different variants, modifications and refinements form part of the scope of the invention, as defined by the following claims. Furthermore, different aspects and features described above can be implemented together, or separately, or are substituted for one another, and all of the different combinations and sub-combinations of the aspects and features form part of the scope of the invention.

The invention claimed is:

1. A method comprising:
    managing reception of digital contents by a management device configured to receive a command for selection of a content, called main content, from a control device, the management device being configured to send a request for access to the main content and other digital contents, called secondary contents, to a service platform through a network, receive data streams representative of the requested contents, and request rendering of the main content, wherein the managing comprises:
    receiving from said network said secondary contents during a given period, and
    in the course of the rendering of the main content, if the given period has expired and the management device no longer receives the secondary contents from said network, receiving data related to a detection of an activity linked to the control device, said data being other than a request to access a content, and which triggers the management device to maintain reception of the main content and to send a request for receiving once again the same secondary contents associated to said maintained main content to said service platform.

2. The management method as claimed in claim 1, wherein if the given period is in the course of execution for the secondary content, detection of the activity of the control device during this period leads to an updating of the period of reception for this secondary content.

3. The management method as claimed in claim 1, wherein the activity is a movement of the control device.

4. The management method as claimed in claim 1, wherein the control device comprises selection keys and the activity is a press on a key of the control device.

5. A device for managing reception of digital contents comprising:
    a processor; and
    a non-transitory computer-readable medium comprising instructions stored thereon which when executed by the processor configure the device to perform acts comprising:
    receiving a command for selection of a content, called main content, from a control device, sending a request for access to the main content and to other digital contents, called secondary contents, to a service platform through a network, receiving data streams representative of the requested contents and requesting rendering of the main content,
    receiving said secondary contents during a given period, and
    in the course of rendering of the main content, if the given period has expired and the management device no longer receives the secondary contents from said network, receiving data related to a detection of an activity linked to the control device, said data being other than a request to access a content, and which triggers the management device to maintain reception of the main content and to send a request for reception once again of the same secondary contents associated to said maintained main content to said service platform.

6. The device as claimed in claim 5, wherein the device is implemented in a decoder.

7. A non-transitory computer-readable medium comprising a computer program stored thereon for implementing a management method on a management device, the program comprising code instructions which, when the program is executed by a processor of the management device, configure the management device to:

receive a command for selection of a content, called main content, from a control device, send a request for access to the main content and to other digital contents, called secondary contents, to a service platform through a network, receive data streams representative of the requested contents and request rendering of the main content, receiving from said network said secondary contents during a given period, and in the course of rendering of the main content, if the given period has expired and the management device no longer receives the secondary contents from said network, receiving data related to a detection of an activity linked to the control device, said data being other than a request to access a content, and which triggers the management device to maintain reception of the main content and to send a request for reception once again of the same secondary contents associated to said maintained main content to said service platform.

\* \* \* \* \*